(12) United States Patent
Mizutani et al.

(10) Patent No.: US 8,264,251 B2
(45) Date of Patent: Sep. 11, 2012

(54) CHARACTERISTIC MEASURING DEVICE FOR SOLAR CELL

(75) Inventors: Yoshinori Mizutani, Tokyo (JP); Taiichiro Suda, Tokyo (JP)

(73) Assignee: Tahara Electric Co., Ltd., Tokyo (JP)

( * ) Notice: Subject to any disclaimer, the term of this patent is extended or adjusted under 35 U.S.C. 154(b) by 0 days.

(21) Appl. No.: 13/140,979

(22) PCT Filed: Aug. 27, 2009

(86) PCT No.: PCT/JP2009/064970
§ 371 (c)(1),
(2), (4) Date: Jun. 20, 2011

(87) PCT Pub. No.: WO2010/070952
PCT Pub. Date: Jun. 24, 2010

(65) Prior Publication Data
US 2011/0316578 A1    Dec. 29, 2011

(30) Foreign Application Priority Data
Dec. 18, 2008  (JP) ................................ 2008-321920

(51) Int. Cl.
*G01R 31/26* (2006.01)
(52) U.S. Cl. .................... 324/761.01; 324/501; 324/434; 324/440; 136/244; 136/290
(58) Field of Classification Search ............. 324/761.01, 324/501, 434, 440; 257/E27.124–E27.126; 136/244, 253, 290; 250/214, 216
See application file for complete search history.

(56) References Cited

U.S. PATENT DOCUMENTS

| | | | | |
|---|---|---|---|---|
| 5,869,956 A | * | 2/1999 | Nagao et al. | 323/299 |
| 2009/0115393 A1 | * | 5/2009 | Yoshida et al. | 323/300 |
| 2009/0303763 A1 | * | 12/2009 | Yuguchi et al. | 363/79 |

FOREIGN PATENT DOCUMENTS

| | | |
|---|---|---|
| JP | 9-043321 | 2/1997 |
| JP | 9-218251 | 8/1997 |
| JP | 2002-111030 | 4/2002 |

OTHER PUBLICATIONS

Japanese Notification of Reasons for Refusal dated Mar. 16, 2010 in Japanese Patent Application No. 2009-553535 with English translation.
International Search Report, PCT/JP2009/064970, Oct. 27, 2009.

* cited by examiner

*Primary Examiner* — Huy Q Phan
*Assistant Examiner* — Thang Le
(74) *Attorney, Agent, or Firm* — Young & Thompson

(57) ABSTRACT

A solar cell characteristic measuring device measures the output characteristics of a solar cell while avoiding junction capacitance. The device provides a solar cell load circuit by connecting the solar cell with an electronic load device setting a load current or voltage variably, and a measurement circuit connecting voltage and current detectors with the load. An operation point control element divides the magnitude of the load, taken from the solar cell, of the electronic load device into a plurality ranging from states of opening to short-circuiting, while driving the load device in the load circuit periodically and intermittently, changing the load magnitude stepwise and controlling the operation point of the solar cell, and a processing element reading and processing the detected values of the voltage and current detectors at each drive period of the electronic load device and for the period of the stable output voltage of the solar cell.

12 Claims, 16 Drawing Sheets

[Fig. 1]
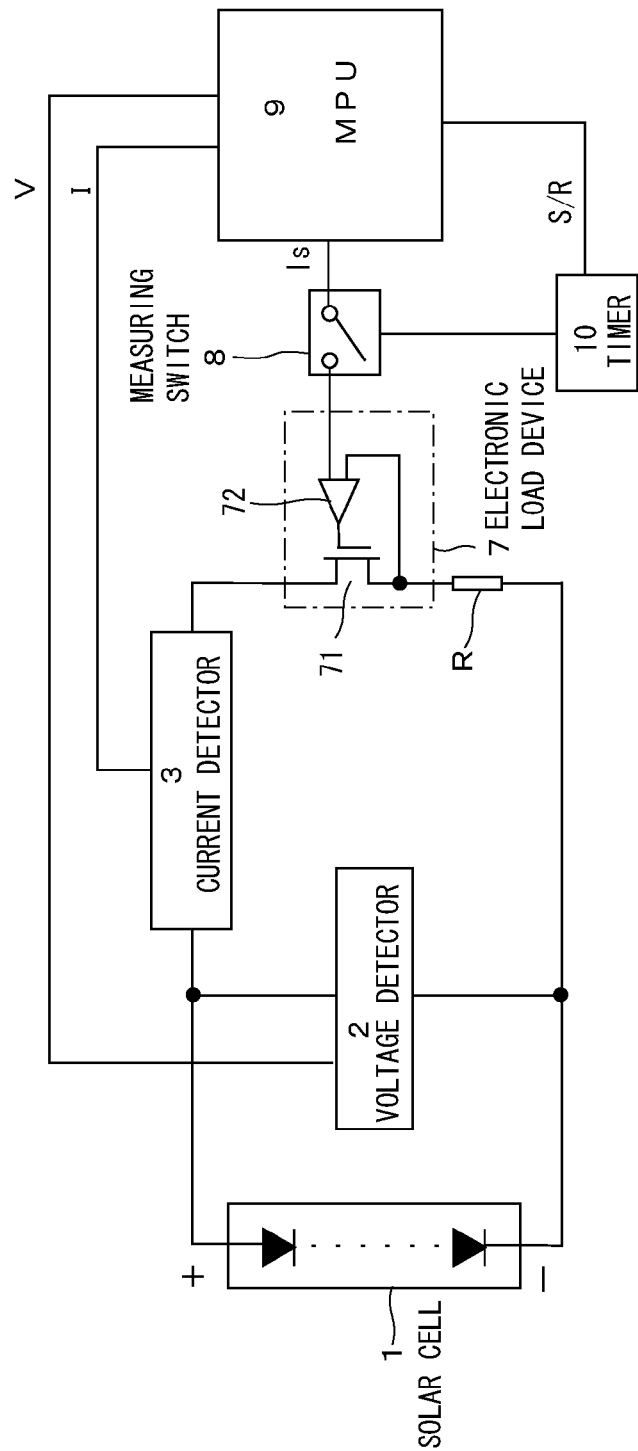

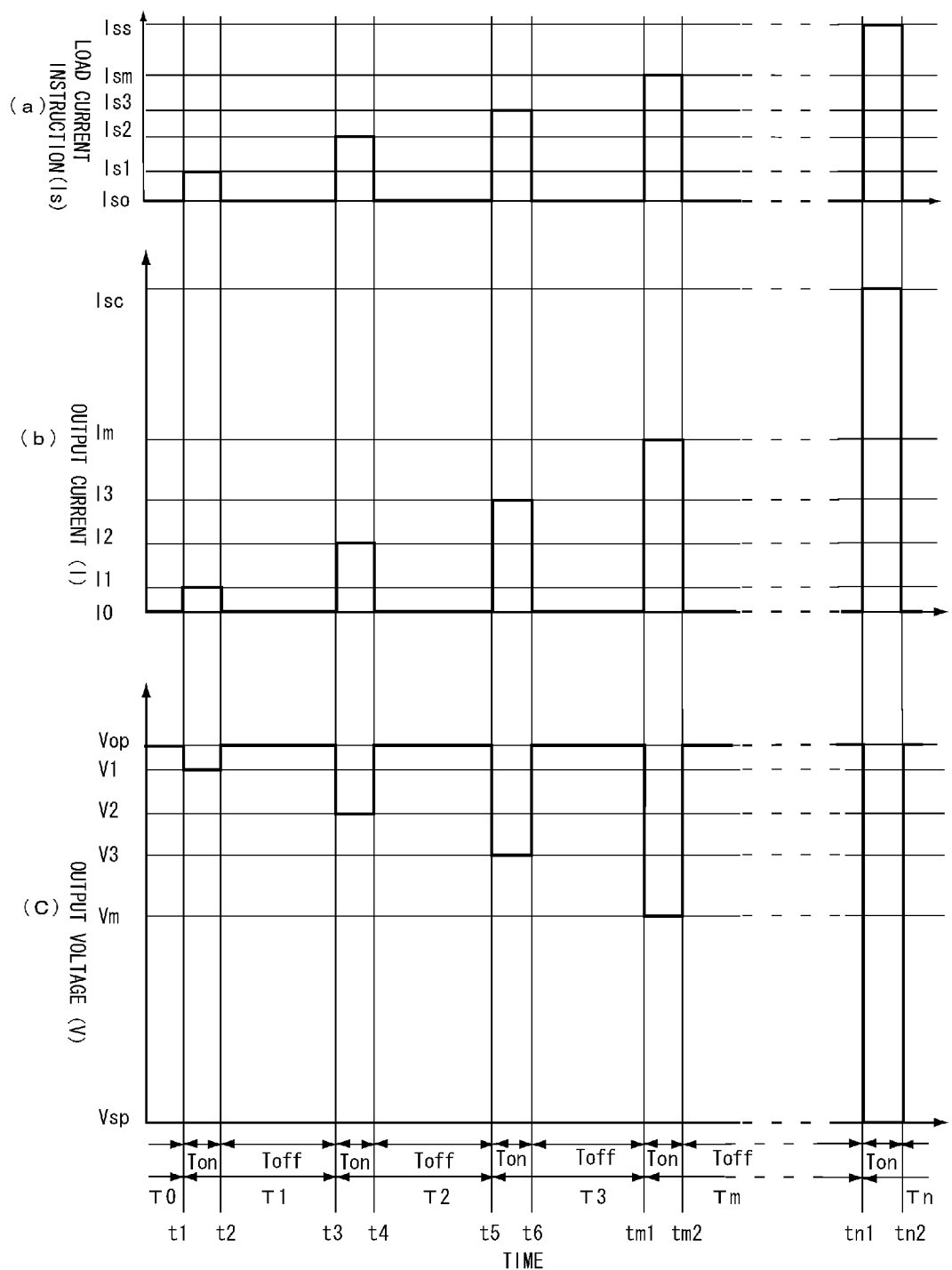

[Fig. 3]
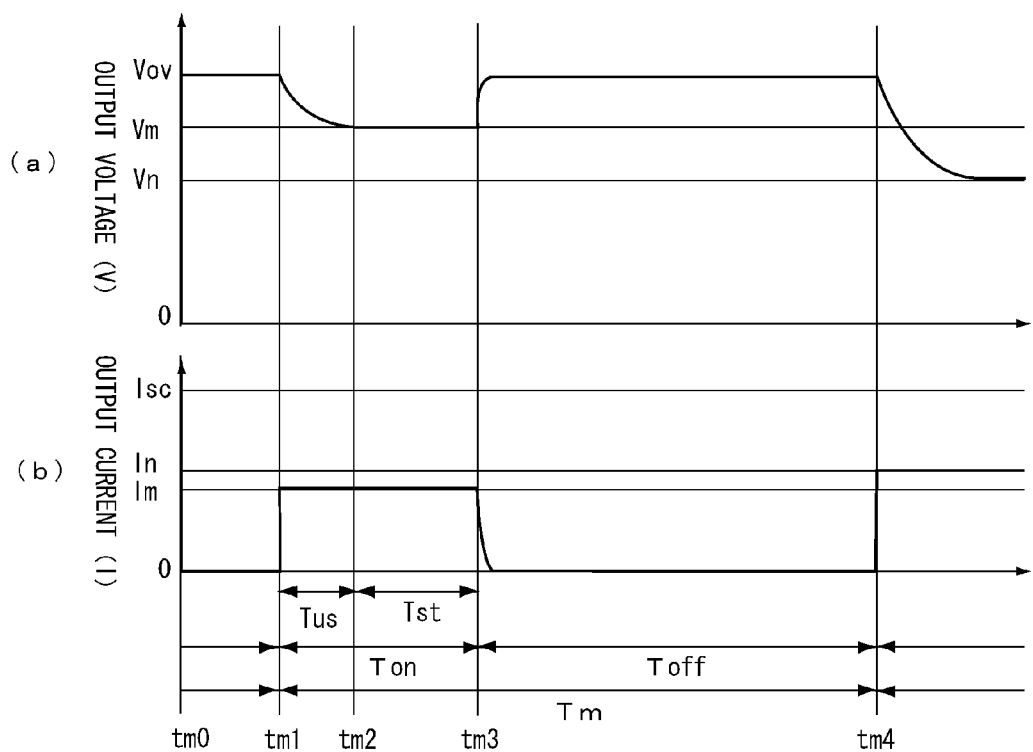

[Fig. 4]
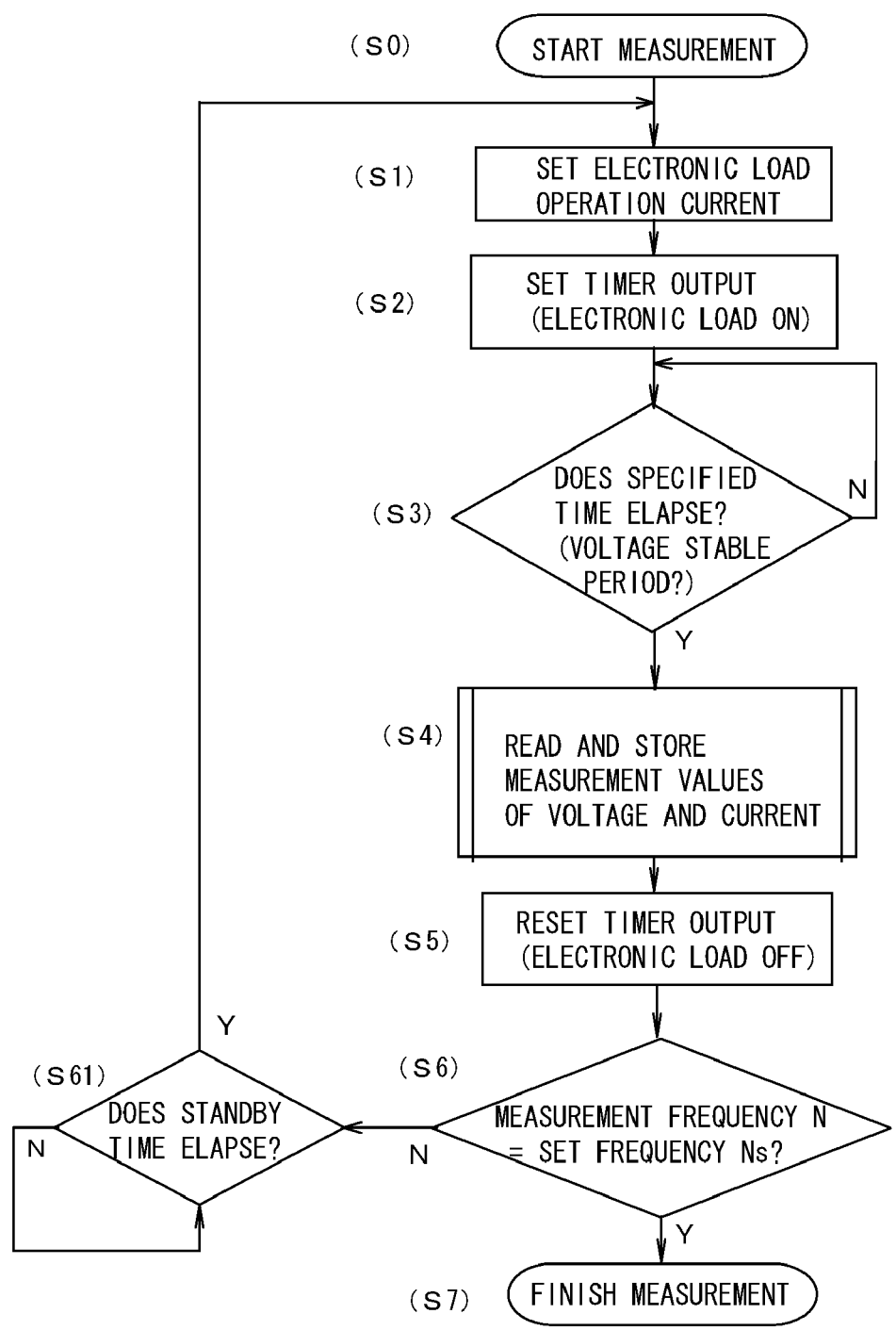

[Fig. 5]
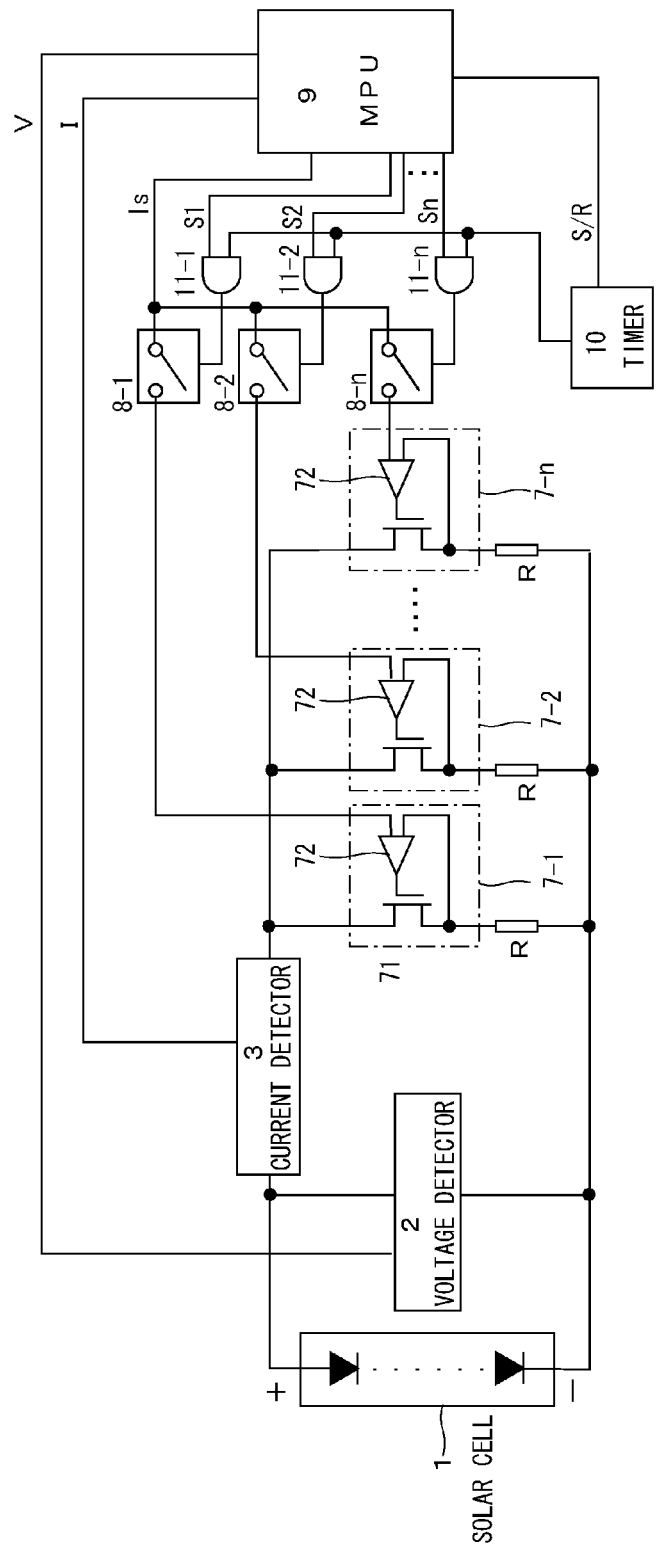

[Fig. 6]
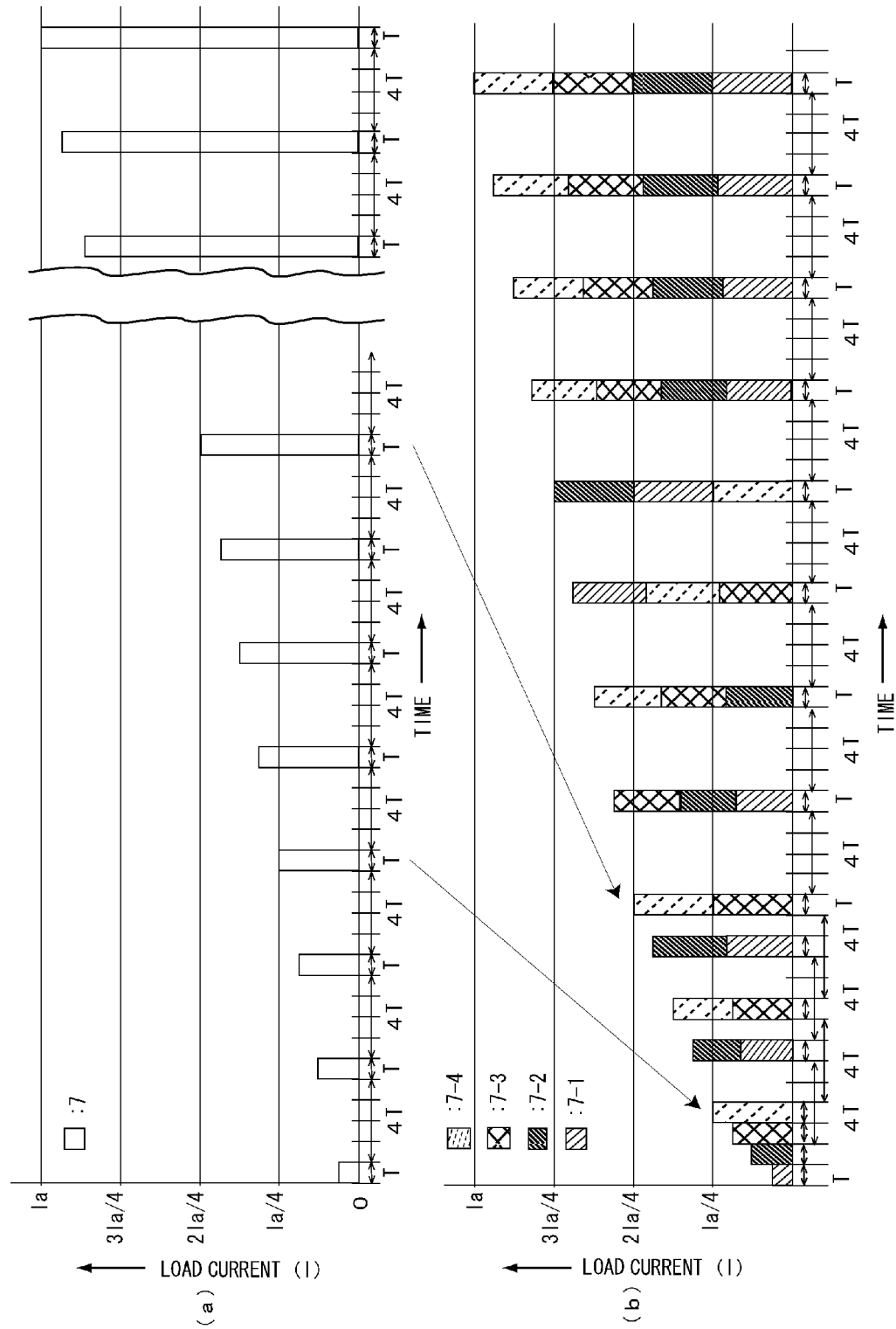

[Fig. 7]
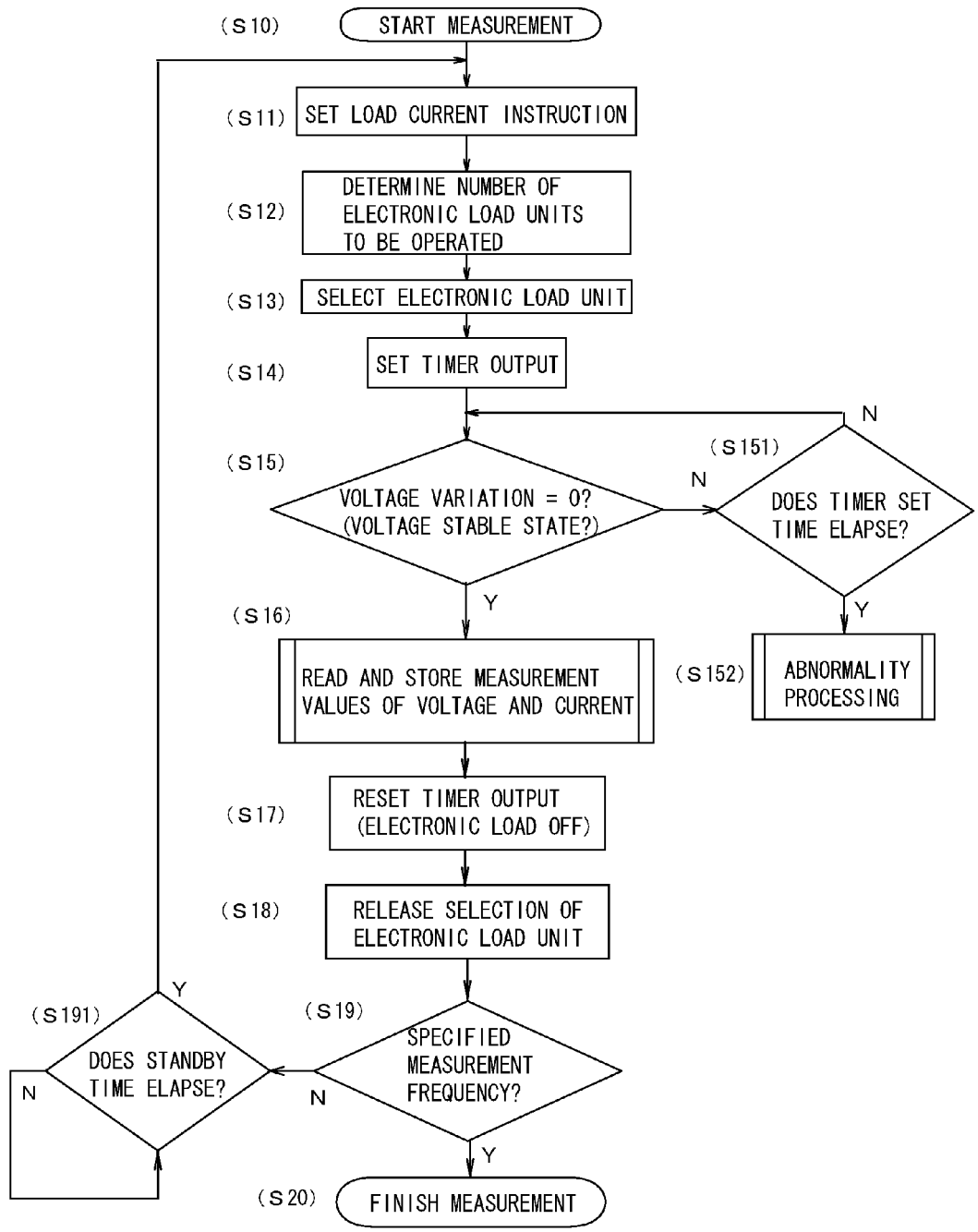

[Fig. 8]
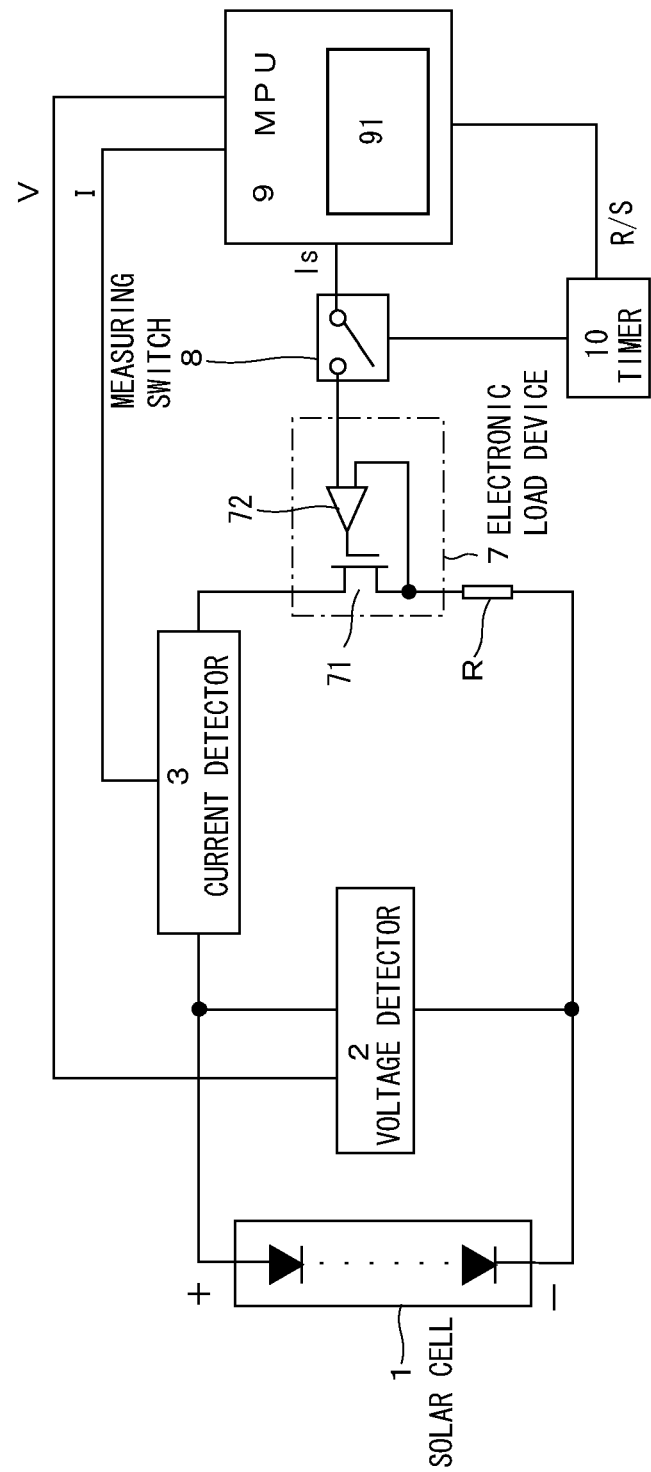

[Fig. 9]
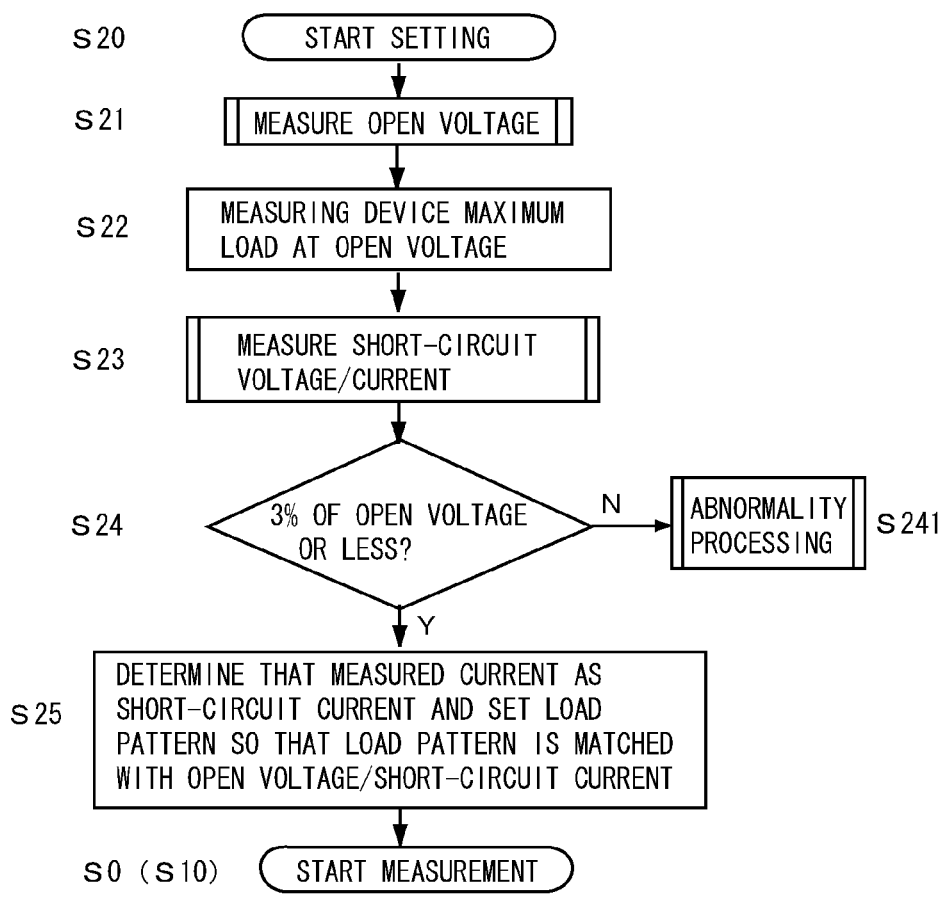

[Fig. 10]

| MEASUREMENT POINT | LOAD CONTROL PATTERN (LOAD CURRENT INSTRUCTION VALUE) (A) | MEASURED VOLTAGE V (V) | MEASURED CURRENT I (A) | MEASURED POWER W (W) |
|---|---|---|---|---|
| 1 | 10.00 | 0.0 | 5.13 | 0.00 |
| 2 | 9.74 | 0.0 | 5.13 | 0.00 |
| 3 | 9.49 | 0.0 | 5.13 | 0.00 |
| 4 | 9.23 | 0.0 | 5.13 | 0.00 |
| 5 | 8.97 | 0.0 | 5.13 | 0.00 |
| 6 | 8.72 | 0.0 | 5.13 | 0.00 |
| 7 | 8.46 | 0.0 | 5.13 | 0.00 |
| 8 | 8.21 | 0.0 | 5.13 | 0.00 |
| 9 | 7.95 | 0.0 | 5.13 | 0.00 |
| 10 | 7.69 | 0.0 | 5.13 | 0.00 |
| 11 | 7.44 | 0.0 | 5.13 | 0.00 |
| 12 | 7.18 | 0.0 | 5.13 | 0.00 |
| 13 | 6.92 | 0.0 | 5.13 | 0.00 |
| 14 | 6.67 | 0.0 | 5.13 | 0.00 |
| 15 | 6.41 | 0.0 | 5.13 | 0.00 |
| 16 | 6.15 | 0.0 | 5.13 | 0.00 |
| 17 | 5.90 | 0.0 | 5.13 | 0.00 |
| 18 | 5.64 | 0.0 | 5.13 | 0.00 |
| 19 | 5.38 | 0.0 | 5.13 | 0.00 |
| 20 | 5.13 | 0.0 | 5.13 | 0.00 |
| 21 | 4.87 | 15.6 | 4.87 | 75.83 |
| 22 | 4.62 | 16.7 | 4.62 | 77.06 |
| 23 | 4.36 | 17.3 | 4.36 | 75.21 |
| 24 | 4.10 | 17.7 | 4.10 | 72.37 |
| 25 | 3.85 | 18.0 | 3.85 | 69.11 |
| 26 | 3.59 | 18.2 | 3.59 | 65.41 |
| 27 | 3.33 | 18.5 | 3.33 | 61.44 |
| 28 | 3.08 | 18.7 | 3.08 | 57.47 |
| 29 | 2.82 | 18.9 | 2.82 | 53.16 |
| 30 | 2.56 | 19.0 | 2.56 | 48.74 |
| 31 | 2.31 | 19.2 | 2.31 | 44.35 |
| 32 | 2.05 | 19.4 | 2.05 | 39.71 |
| 33 | 1.79 | 19.5 | 1.79 | 34.96 |
| 34 | 1.54 | 19.7 | 1.54 | 30.31 |
| 35 | 1.28 | 19.8 | 1.28 | 25.37 |
| 36 | 1.03 | 20.0 | 1.03 | 20.56 |
| 37 | 0.77 | 20.1 | 0.77 | 15.48 |
| 38 | 0.51 | 20.2 | 0.51 | 10.32 |
| 39 | 0.26 | 20.4 | 0.26 | 5.30 |
| 40 | 0.00 | 20.5 | 0.00 | 0.00 |

[Fig. 11]

| MEASUREMENT POINT | LOAD CONTROL PATTERN (LOAD CURRENT INSTRUCTION VALUE) (A) | MEASURED VOLTAGE V (V) | MEASURED CURRENT I (A) | MEASURED POWER W (W) |
|---|---|---|---|---|
| 1 | 6.00 | 0.00 | 5.13 | 0.00 |
| 2 | 5.85 | 0.00 | 5.13 | 0.00 |
| 3 | 5.69 | 0.00 | 5.13 | 0.00 |
| 4 | 5.54 | 0.00 | 5.13 | 0.00 |
| 5 | 5.38 | 0.00 | 5.13 | 0.00 |
| 6 | 5.23 | 0.00 | 5.13 | 0.00 |
| 7 | 5.08 | 4.96 | 5.08 | 25.20 |
| 8 | 4.92 | 15.06 | 4.92 | 74.10 |
| 9 | 4.77 | 16.16 | 4.77 | 77.08 |
| 10 | 4.62 | 16.68 | 4.62 | 77.06 |
| 11 | 4.46 | 17.06 | 4.46 | 76.09 |
| 12 | 4.31 | 17.34 | 4.31 | 74.74 |
| 13 | 4.15 | 17.58 | 4.15 | 72.96 |
| 14 | 4.00 | 17.77 | 4.00 | 71.08 |
| 15 | 3.85 | 17.95 | 3.85 | 69.11 |
| 16 | 3.69 | 18.12 | 3.69 | 66.86 |
| 17 | 3.54 | 18.26 | 3.54 | 64.64 |
| 18 | 3.38 | 18.41 | 3.38 | 62.23 |
| 19 | 3.23 | 18.54 | 3.23 | 59.88 |
| 20 | 3.08 | 18.66 | 3.08 | 57.47 |
| 21 | 2.92 | 18.78 | 2.92 | 54.84 |
| 22 | 2.77 | 18.89 | 2.77 | 52.33 |
| 23 | 2.62 | 19.00 | 2.62 | 49.78 |
| 24 | 2.46 | 19.11 | 2.46 | 47.01 |
| 25 | 2.31 | 19.20 | 2.31 | 44.35 |
| 26 | 2.15 | 19.31 | 2.15 | 41.52 |
| 27 | 2.00 | 19.40 | 2.00 | 38.80 |
| 28 | 1.85 | 19.49 | 1.85 | 36.06 |
| 29 | 1.69 | 19.59 | 1.69 | 33.11 |
| 30 | 1.54 | 19.68 | 1.54 | 30.31 |
| 31 | 1.38 | 19.77 | 1.38 | 27.28 |
| 32 | 1.23 | 19.85 | 1.23 | 24.42 |
| 33 | 1.08 | 19.93 | 1.08 | 21.52 |
| 34 | 0.92 | 20.02 | 0.92 | 18.42 |
| 35 | 0.77 | 20.10 | 0.77 | 15.48 |
| 36 | 0.62 | 20.18 | 0.62 | 12.51 |
| 37 | 0.46 | 20.26 | 0.46 | 9.32 |
| 38 | 0.31 | 20.34 | 0.31 | 6.31 |
| 39 | 0.15 | 20.42 | 0.15 | 3.06 |
| 40 | 0.00 | 20.50 | 0.00 | 0.00 |

[Fig. 12]

| MEASUREMENT POINT | LOAD CONTROL PATTERN (LOAD CURRENT INSTRUCTION VALUE) (A) | MEASURED VOLTAGE V (V) | MEASURED CURRENT I (A) | MEASURED POWER W (W) |
|---|---|---|---|---|
| 1 | 6.00 | 0.00 | 5.13 | 0.00 |
| 2 | 5.90 | 0.00 | 5.13 | 0.00 |
| 3 | 5.80 | 0.00 | 5.13 | 0.00 |
| 4 | 5.70 | 0.00 | 5.13 | 0.00 |
| 5 | 5.60 | 0.00 | 5.13 | 0.00 |
| 6 | 5.50 | 0.00 | 5.13 | 0.00 |
| 7 | 5.40 | 0.00 | 5.13 | 0.00 |
| 8 | 5.30 | 0.00 | 5.13 | 0.00 |
| 9 | 5.20 | 0.00 | 5.13 | 0.00 |
| 10 | 5.10 | 2.94 | 5.10 | 14.99 |
| 11 | 5.00 | 12.65 | 5.00 | 63.25 |
| 12 | 4.90 | 15.29 | 4.90 | 74.92 |
| 13 | 4.80 | 16.01 | 4.80 | 76.85 |
| 14 | 4.70 | 16.44 | 4.70 | 77.27 |
| 15 | 4.60 | 16.74 | 4.60 | 77.00 |
| 16 | 4.50 | 16.98 | 4.50 | 76.41 |
| 17 | 4.40 | 17.18 | 4.40 | 75.59 |
| 18 | 4.30 | 17.35 | 4.30 | 74.61 |
| 19 | 4.20 | 17.51 | 4.20 | 73.54 |
| 20 | 4.10 | 17.65 | 4.10 | 72.37 |
| 21 | 4.00 | 17.77 | 4.00 | 71.08 |
| 22 | 3.90 | 17.89 | 3.90 | 69.77 |
| 23 | 3.80 | 18.00 | 3.80 | 68.40 |
| 24 | 3.70 | 18.11 | 3.70 | 67.01 |
| 25 | 3.60 | 18.21 | 3.60 | 65.56 |
| 26 | 3.36 | 18.43 | 3.36 | 61.92 |
| 27 | 3.12 | 18.62 | 3.12 | 58.09 |
| 28 | 2.88 | 18.81 | 2.88 | 54.17 |
| 29 | 2.64 | 18.98 | 2.64 | 50.11 |
| 30 | 2.40 | 19.15 | 2.40 | 45.96 |
| 31 | 2.16 | 19.30 | 2.16 | 41.69 |
| 32 | 1.92 | 19.45 | 1.92 | 37.34 |
| 33 | 1.68 | 19.59 | 1.68 | 32.91 |
| 34 | 1.44 | 19.73 | 1.44 | 28.41 |
| 35 | 1.20 | 19.87 | 1.20 | 23.84 |
| 36 | 0.96 | 20.00 | 0.96 | 19.20 |
| 37 | 0.72 | 20.13 | 0.72 | 14.49 |
| 38 | 0.48 | 20.25 | 0.48 | 9.72 |
| 39 | 0.24 | 20.38 | 0.24 | 4.89 |
| 40 | 0.00 | 20.50 | 0.00 | 0.00 |

[Fig. 13]

|  | SETTING METHOD OF EMBODIMENT 1 | | | | SETTING METHOD 1 OF EMBODIMENT 3 | | | | SETTING METHOD 2 OF EMBODIMENT 3 | | | |
|---|---|---|---|---|---|---|---|---|---|---|---|---|
|  |  | V | I | W |  | V | I | W |  | V | I | W |
| EXTRACTED MEASUREMENT POINTS | POINTS 21 | 15.57 | 4.87 | 75.83 | POINTS 8 | 15.06 | 4.92 | 74.10 | POINTS 13 | 16.20 | 4.76 | 77.11 |
|  | POINTS 23 | 16.68 | 4.62 | 77.06 | POINTS 9 | 16.16 | 4.77 | 77.08 | POINTS 14 | 16.54 | 4.67 | 77.24 |
|  | POINTS 24 | 17.25 | 4.36 | 75.21 | POINTS 10 | 16.68 | 4.62 | 77.06 | POINTS 15 | 16.79 | 4.58 | 76.90 |
| LAGRANGIAN SECONDARY INTERPOLATION RESULT |  | 16.34 | 4.73 | 77.36 |  | 16.41 | 4.70 | 77.19 |  | 16.43 | 4.70 | 77.28 |

[Fig. 14]
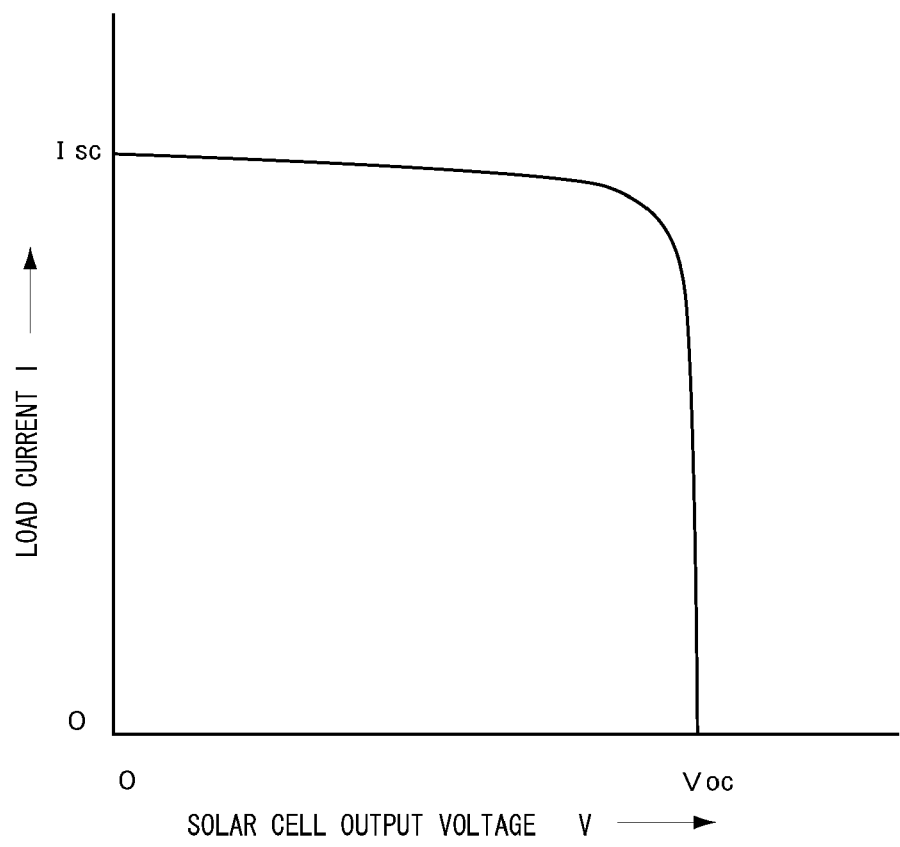

[Fig. 15]
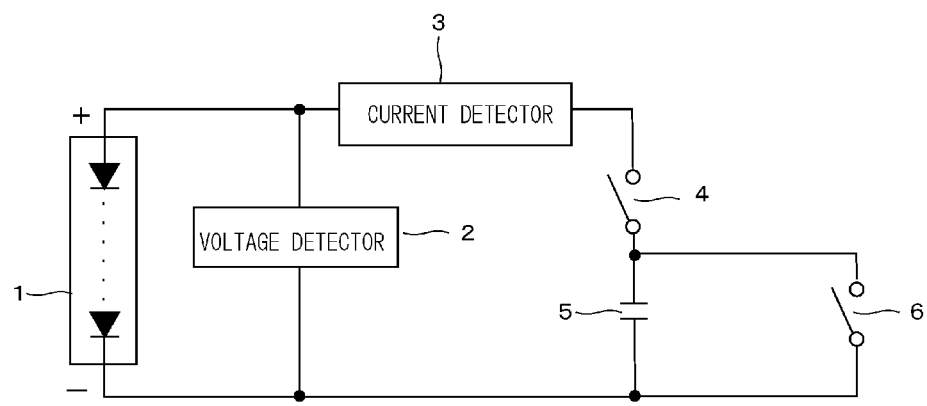
[Fig. 16]
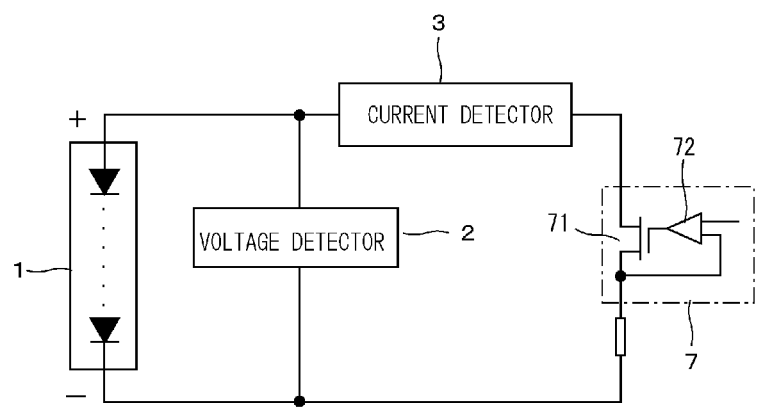

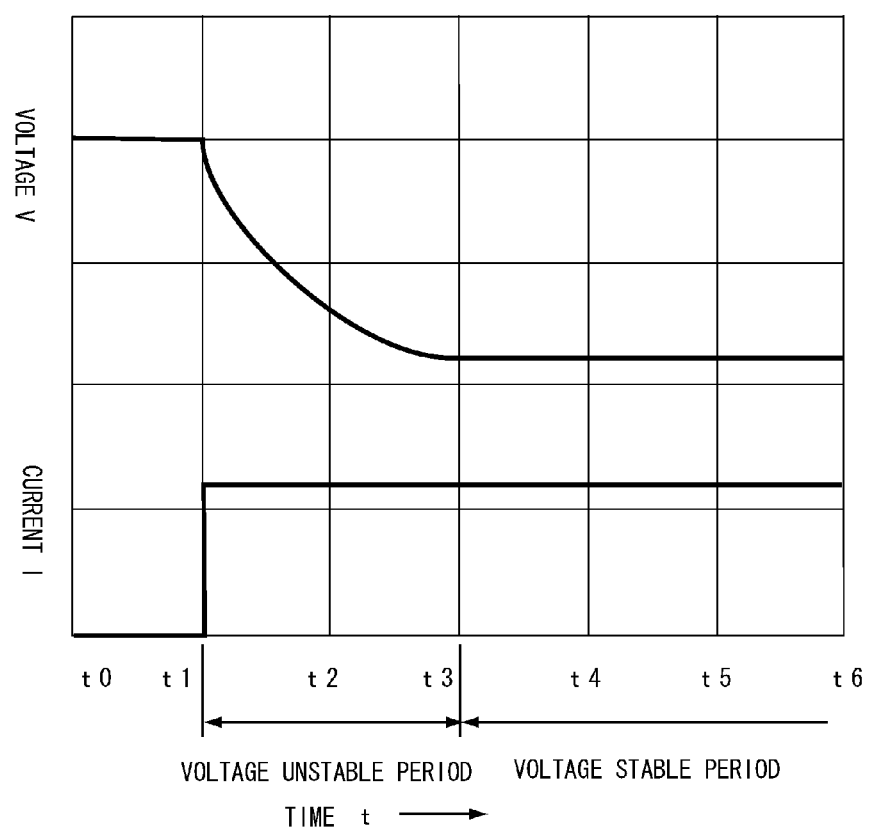
[Fig. 17]

US 8,264,251 B2

CHARACTERISTIC MEASURING DEVICE FOR SOLAR CELL

TECHNICAL FIELD

The present invention relates to a characteristic measuring device for a solar cell that measures an output characteristic of a solar cell or solar-cell module, particularly a current-voltage (I-V) characteristic.

BACKGROUND ART

In order to put energy of sunlight to practical use, a solar cell for converting light energy to electrical energy has been broadly used.

Estimation of the performance of the solar cell as described above has required measurement of an output characteristic as shown in FIG. 14, that is, a current-voltage (I-V) characteristic.

The measurement of the output characteristic of a solar cell is performed by irradiating the solar cell with pseudo sunlight or natural sunlight, varying the operation point of the solar cell between a voltage point Voc under an open state of the solar cell and a current point Isc under a short-circuit state in FIG. 14 and measuring an output voltage and an output current at that time. For example, a capacitance load system as disclosed in Patent Document 1 or an electronic load system as disclosed in Patent Document 2 is known as a system for varying the operation point of the solar cell.

FIG. 15 is a diagram showing the construction of a solar cell characteristic measuring device based on a conventional capacitance load system.

In this measuring device, 1 represents a solar cell as an output characteristic measuring target, 2 represents a voltage detector for detecting an output voltage of the solar cell 1, 3 represents a current detector for detecting an output current of the solar cell, 5 represents a load capacitor which is connected to the output of the solar cell 1 through the current detector 2 and a measuring switch 4 in series, and 6 represents a discharging switch 6 connected to the load capacitor 5 in parallel.

The measurement of the output characteristic is performed by turning on the measuring switch 4 to supply charging current from the solar cell 1 to the load capacitor 5 under the state that the solar cell 1 is irradiated with pseudo sunlight or natural sunlight, thereby applying a load state to the solar cell 1 while the load state varies from a load short-circuit state to a load open state, and measuring an output voltage V and an output current I with the voltage detector 2 and the current detector 3. Re-measurement is executed after charged charges in the load capacitor 5 are discharged by turning off the measuring switch 4 and turning on the discharging switch 6.

Furthermore, as shown in FIG. 16, the measuring device based on the electronic load system is configured so that an electronic load 7 constructed by an electronic control element 71 comprising an electric field effect transistor or the like, an operational amplifier 72 for driving the electronic control element 71, etc. is used in place of the load capacitor 5 and the load current or voltage of the solar cell 1 is adjusted by this electronic load 7. A signal for continuously varying the output current of the solar cell is supplied to an input of the operational amplifier 72 of the electronic load 7 to vary the load state of the solar cell from the load open state to the load short-circuit state as in the case of the capacitor load system, and the output voltage and the output current are measured by the voltage detector 2 and the current detector 3, thereby measuring the output characteristic.

A solar cell has a PN junction portion irrespective of the form of the solar cell such as crystalline form or noncrystalline form, and junction capacitance exists at this junction portion. When load current is taken out from the solar cell, during the period from the time when a load is put in till the time when the value of an output voltage V is stabilized to a true value thereof, this junction capacitance causes existence of a voltage unstable period (t1-t3) which corresponds to the charging/discharging time of charges in the junction capacitance and in which an output voltage V is unstable as shown in FIG. 17.

Therefore, with respect to the conventional output characteristic measuring device for the solar cell, a time delay occurs at the measurement start time until the voltage rises up to the true value thereof, and thus the output voltage cannot be accurately measured just after the load of the solar cell is put in, so that a measurement error occurs. Furthermore, the output current has a larger value because charges are charged/discharged to/from the junction capacitance, and this causes a problem that the output characteristic cannot be accurately measured.

PRIOR ART DOCUMENT

Patent Document
  Patent Document 1: JP-A-2000-196115
  Patent Document 2: JP-A-2003-028916

DISCLOSURE OF THE INVENTION

Problem to be Solved by the Invention
  In order to solve the foregoing problem of the conventional device, according to the present invention, there is provided a characteristic measuring device for a solar cell that can accurately measure the output characteristic of the solar cell with avoiding an influence of junction capacitance of the solar cell.
Means of Solving the Problem
  In order to solve the above problem, according to the present invention, there is provided a solar cell characteristic measuring device having a load circuit for a solar cell that is configured so that an electronic load device for enabling a load current or load voltage to be variably set is connected to the solar cell, and a measuring circuit configured so that a voltage detector and a current detector are connected to the load circuit, characterized by including: an operation point control means for controlling an operation point of the solar sell by sectionalizing magnitude of a load taken from the solar cell by the electronic load device in a range from an open state of the solar cell till a short-circuit state of the solar cell and stepwise changing the magnitude of the load while periodically intermittently operating the electronic load device in the load circuit; and a processing means for reading detection values of the voltage detector and the current detector of the measuring circuit during a period when an output voltage of the solar cell is stable every operation period of the electronic load device, and processing the read data to determine an output characteristic.

In the present invention, the operation point control means is configured to apply an operation instruction to the electronic load device at a predetermined period, and a time width of the operation instruction is set to be longer than a time period from application of a load to the solar cell till stabilization of the output voltage. By reading the detection values of the voltage detector and the current detector by the processing means after the output voltage of the solar cell is stabilized, the output voltage and output current of the solar cell can be surely measured at the timing when the output voltage varying due to put-in of the load is stabilized and thus has a true value, thereby establishing accuracy.

The time width of the operation instruction may be changed in accordance with a load current value to be instructed to the electronic load device.

Furthermore, variation of the output voltage of the solar cell after the operation instruction is applied to the electronic load device may be monitored to detect a timing at which the output voltage does not vary, the detection values of the voltage detector and the current detector may be read by the processing means at the detection timing, and the operation instruction may be stopped after the reading.

According to the present invention, the electronic load device can be prevented from being overheated by providing means for forcedly interrupting the operation instruction applied from the operation point control means to the electronic load device when the operation instruction continues for a predetermined time or more.

Still furthermore, according to the present invention, the electronic load device may be constructed by plural electronic load units, and the electronic load units may be combined and selectively operated every electronic load unit or every plural electronic load units, whereby the measurement speed can be increased.

In the present invention, there is provided a load control pattern setting means for measuring a voltage under an open state of the solar cell and a current under a short-circuit state of the solar cell before a characteristic measurement is started, and creating and setting a load control pattern on the basis of the measured open voltage and short-circuit current, and the electronic load device is controlled according to the load control pattern set by the load control pattern setting means to perform a characteristic measurement. At this time, the load control pattern setting means may set a measuring section minutely in a range larger than 50% of the measured open voltage or short-circuit current.

Effect of the Invention

According to the present invention, the electronic load device that can variably set the load current or voltage is connected to the solar cell, and the magnitude of the load taken by the electronic load device is sectioned into plural stages in the range from the open state of the solar cell to the short-circuit state of the solar cell and stepwise controlled to change the operation point of the solar cell. At each stage, the detection values of the voltage detector and the current detector of the measuring circuit of the solar cell are read out at the timing when the load is imposed on the solar cell and the output voltage is stabilized. Therefore, the output voltage and the output current of the solar cell can be accurately measured without being affected by the junction capacitance of the solar cell, so that the output characteristic of the solar cell can be accurately determined.

BRIEF DESCRIPTION OF THE DRAWINGS

FIG. 1 is a block circuit diagram showing the construction of a characteristic measuring device for a solar cell according to an embodiment 1 of the present invention.

FIG. 2 is a diagram showing time variations of a load current instruction Is, a solar cell output current I and a solar cell output voltage V under measuring operation which are used to describe the operation of the device according to the embodiment 1 of the present invention.

FIG. 3 is an operation waveform diagram of the output voltage V and the output current I of the solar cell in the device according to the embodiment 1 of the present invention.

FIG. 4 is a flowchart showing the operation of the device according to the embodiment 1 of the present invention.

FIG. 5 is a block circuit diagram showing the construction of a characteristic measuring device for a solar cell according to an embodiment 2 of the present invention.

FIG. 6 is a diagram showing control patterns of electronic load devices according to the embodiment 1 and the second embodiment 2 of the present invention.

FIG. 7 is a flowchart showing the operation of the device according to the embodiment 2 of the present invention.

FIG. 8 is a block circuit diagram showing the construction of a characteristic measuring device for a solar cell according to an embodiment 3 of the present invention.

FIG. 9 is a flowchart showing the operation of the device according to the embodiment 3 of the present invention.

FIG. 10 is a diagram showing a measurement result obtained by the device according to the embodiment 1 of the present invention.

FIG. 11 is a diagram showing a measurement result obtained by a setting method 1 of the device according to the embodiment 3 of the present invention.

FIG. 12 is a diagram showing a measurement result obtained by a setting method 2 of the device according to the embodiment 1 of the present invention.

FIG. 13 is a diagram showing comparison of characteristic values obtained by three setting methods of a load control pattern according to the present invention.

FIG. 14 is a diagram showing a current-voltage curved line representing a general output characteristic of a solar cell.

FIG. 15 is a block circuit diagram showing the construction of a conventional solar cell characteristic device based on a capacitor load system.

FIG. 16 is a block circuit diagram showing the construction of a conventional solar cell characteristic device based on an electronic load system.

FIG. 17 is a waveform diagram showing voltage and current variations in connection with input of a load into a solar cell.

BEST MODES FOR CARRYING OUT THE INVENTION

The modes of the present invention will be described on the basis of embodiments shown in the figures.

Embodiment 1

FIG. 1 is a block circuit diagram showing the construction of a characteristic measuring device for a solar cell according to a first embodiment of the present invention.

In FIG. 1, 1 represents a solar cell as a measurement target, 2 represents a voltage detector for detecting an output voltage V of the solar cell 1, and 3 represents a current detector for detecting an output current I of the solar cell 1. Furthermore, 7 represents an electronic load device which is connected to an output terminal of the solar cell 1 to adjust a load amount applied to the solar cell 1. The electronic load device 7 is constructed by an electronic control element 71 comprising an electric field effect transistor or the like, a drive amplifier 72 comprising an operational amplifier for driving and controlling the electronic control element 71, and a reference resistor R. 9 represents an arithmetic processing unit (hereinafter referred to as MPU) comprising a microprocessor for controlling the overall device, and it instructs an operation current value to the electronic load device 7 through a measuring switch 8 periodically according to a built-in program and instructs to set (S) or reset (R) a timer 10 for controlling opening/closing the measuring switch 8. Furthermore, MPU 9 execute A/D conversion on detection values of voltage and current (measurement values) from the voltage detector 2 and the current detector 3 at the optimum timing according to a built-in program to read these measurement values, stores the measurement values into a built-in memory, and executes the processing of determining the output characteristic of the solar cell on the basis of the stored measurement values.

In this embodiment 1, the electronic load device 7 comprises a single electronic load unit, and thus the electronic load device 7 is required to have a capacity which can cover the whole capacity of the output of the solar cell 1 as a measurement target.

The measurement of the characteristic of the solar cell according to the device of the embodiment 1 is basically the same as the conventional measuring device based on the electronic load system. That is, various load current instructions Is are applied to the drive amplifier 72 of the electronic load device 7, whereby the electronic control element 71 is controlled so that the load current I of the solar current 1 is equal to an instructed current value, thereby changing the operation point of the solar cell 1. Therefore, the voltage and current of the load circuit of the solar cell 1 are measured by the voltage detector 2 and the current detector 3 at each changed operation point, whereby the output characteristic of the solar cell is determined.

At this time, when the load current instruction Is to be applied to the electronic load device 7 so as to change the operation point of the solar cell 1 is continuously given as is conventionally done, the electronic load device 7 continuously operates. Therefore, the electronic control element 71 is required to have a heat capacity having a large continuous rating, and thus a radiator to be connected to the electronic control element 71 is also required to be a large-size radiator having a large heat capacity, so that the whole size of the electronic load device 7 is large.

In the present invention, in order to make the whole of the electronic load 7 containing the radiator compact, the load current instruction Is to be applied to the electronic load device 7 is given from MPU 9 at a short time interval of about several ms to about 10 ms at a predetermined period T as shown in FIG. 2(a), whereby a driving period (ON period) Ton in which the electronic control element 71 of the electronic load device 7 bears the load current is reduced to be as short as possible.

FIGS. 2(b) and (c) show the load current instruction Is and simplified waveforms of the output current I and the output voltage V of the solar cell 1 when the electronic load device 7 is intermittently operated on the basis of the load current instruction Is varied at the constant period T according to the present invention to measure the output characteristic of the solar cell 1. The ON period Ton during which the load current instruction Is is applied to the electronic load device 7 so that the electronic load device 7 is operated is set to about ⅕ of the intermittent period T, and an OFF period Toff during which the operation of the electronic load device 7 is stopped is set to ⅘. However, the present invention is not limited to this values, and these periods may be arbitrarily determined in accordance with the characteristic of the electronic control element 71 of the electronic load device 7 to be used, etc.

That is, during the ON period Ton, the electronic load device 7 bears the load current I of the solar cell 1, so that the electronic load device 7 generates heat and accumulates the heat. It is better that the accumulated heat caused by the load current is small, and thus it is preferable that the ON period Ton is as short as possible. The OFF period Toff during which the electronic load device 7 is turned off and thus heat generation is stopped corresponds to a period in which the heat accumulated in the electronic control element 71 during the ON period Ton is radiated to prepare for burden of next load current. Therefore, the OFF period Toff is required to be set to a time for which the heat accumulated in the electronic load device 7 during the ON period Ton can be sufficiently radiated, and thus it is determined in accordance with the heat characteristic of the electronic load device 7.

The load current instruction Is to be applied to the electronic load device 7 is set so that the range thereof from a load current instruction value Is0 for setting the solar cell to an open state to a load current instruction value Iss for setting the solar cell to a short-circuit state is sectioned into plural stages like Is0, Is1, Is2, . . . , Iss or the like. When the load current instructions Is of the respective stages sectioned as described are successively applied to the electronic load device 7 at a predetermined period T, the output current I of the solar cell 1 is controlled to be set to current I0, I1, I2, . . . , Isc corresponding to the current value instructed as shown in FIG. 2(b) by the electronic load device 7 in accordance with the application of the load current instruction Is. Furthermore, by controlling the load current I as described above, the output voltage V is set to the voltage Vop, V1, V2, . . . , Vsp corresponding to each load current as shown in FIG. 2(c), whereby plural operation points are set in the range from the open state of the solar cell 1 to the short-circuit state.

Therefore, the output voltage V and the output current I of the solar cell 1 are measured by the voltage detector 2 and the current detector 3 respectively in the ON period Ton during which the electronic load device 7 is operated at each period and the load is taken from the solar cell 1, and the current-voltage characteristic of the output of the solar cell 1 can be determined on the basis of the measurement values.

The solar cell 1 has junction capacitance irrespective of the crystalline form or the noncrystalline form, and the output voltage V and the current I at each period have waveforms as shown in FIGS. 3(a) and (b).

That is, when a load current instruction Ism is given from MPU 9 to the electronic load 7 at the time point of tm1 in FIG. 3, the electronic load 7 is immediately turned on, and the output (load) current I of the solar cell 1 is adjusted to be equal to an instructed current value Im.

Furthermore, as shown in FIG. 3(a), the output voltage V of the solar cell 1 likewise decreases gently from the open state voltage Voc till the voltage Vm corresponding to the load current Im according to the time constant of the load circuit during the period Tus corresponding to the discharge time of charges of charging of the junction capacitance, and becomes a stabilized voltage. The solar cell 1 necessarily has the voltage variation as described above when the electronic load device 7 is put in. A period Tus in which this voltage varies and thus it is not stabilized is referred to as a voltage unstable period, and a period Tst in which the voltage is stabilized to a predetermined voltage is referred to as a voltage stable period.

When the voltage and the current are measured during the voltage unstable period Tus of the ON period Ton in which the electronic load 7 is put in, the output voltage of the solar cell 1 does not indicate a true value and thus the measurement cannot be accurately performed.

Therefore, according to the present invention, MPU 9 reads the detection values of the voltage detector 2 and the current detector 3 in the voltage stable period Tst after passage of the voltage unstable period Tus of the ON period Ton of the electronic load device 7, whereby the voltage and the current are accurately measured. Accordingly, the ON period Ton is set to a time period for which a voltage stable period Tst having a sufficient length for the measurement of the voltage and the current after passage of the voltage unstable period Tus can be secured.

Next, a specific measuring operation of the output characteristic of the solar cell 1 by the device according to the embodiment 1 of FIG. 1 will be described with reference to the flowchart of FIG. 4.

When a measurement start is instructed to MPU 9 in step S0, the load current instruction Is is output to the measuring switch 8 according to a preset program from MPU 9 to the electronic load device 7 in step S1. The load current instruction Is output to the measuring switch 8 is applied as a pulse signal whose amplitude is set to the height corresponding to an instruction value on a case-by-case basis and whose time width corresponds to a preset ON period Ton (see FIG. 2, FIG. 3).

In next step S2, the timer 10 is supplied with a set signal S from MPU 9 to be set. The timer 10 comprises a one-shot timer circuit or the like, and it operates so as to generate an output for only a preset time when the set signal S is input thereto and stop the output signal at the time point when a reset signal R is input thereto within the set time. The set time of the timer 10 is set to a maximum permissible current supply time Tmax which is determined on the basis of the heat characteristic or the like of the electronic control element 71 of the electronic load device 7 so that the electronic control element 71 of the electronic load device 7 is prevented from being overheated due to current supply. The timer 10 starts a time counting operation when the set signal S is supplied from MPU 9 to the timer 10, and outputs an ON signal to the measuring switch 8 until the reset signal R is input thereto or the time reaches the set time Tmax and thus the timer 10 is reset. Therefore, during the period for which the timer 10 is set, the measuring switch 8 is turned on, and the load current instruction Is is applied to the drive amplifier 72 of the electronic load device 7 to turn on the electronic control element 71. The load current I flowing through the turn-on electronic control element 71 is adjusted to be equal to the current value instructed by the drive amplifier 72.

As described above, when the electronic load device 7 is turned on, in order to detect whether the time has passed over the voltage unstable period Tus caused by the junction capacitance of the solar cell 1 from the time point of turn-on in step S3 and reaches the voltage stable period Tst, MPU 9 determines whether the lapse time from the time point when the electronic load device 7 is turned on has passed over a specified time which is preset to be longer than the estimated voltage unstable period Tus. When the lapse time has not passed over the specified time, the processing returns to the entrance of the step S3 at the branch N, and repeats the determination processing of the step S3 until the lapse time has passed over the specified time.

When it is determined in step S3 that the specified time has passed, the processing goes to step S4 from the branch Y so that the detection values of the voltage detector 2 and the current detector 3 are subjected to A/D conversion and read as measurement data in MPU 9, and stores the read-out measurement data into an internal memory. When the voltage and current measuring processing is finished, the processing goes to step S5 to execute the processing of resetting the timer 10 from MPU 9. Accordingly, the timer 10 is reset and the output is stopped, whereby the measuring switch 8 is turned off and the load current instruction Is to the electronic load device 7 is interrupted, and thus the electronic load device 7 is turned off.

Through this processing, one measurement processing of the voltage and the current is finished. Accordingly, this processing is added to the frequency of the measurement processing, and it is determined whether the present measurement processing frequency N reaches a preset frequency Ns in step S6. When the measurement processing frequency N does not reach the set frequency Ns, the processing shifts to step S61 at the branch N.

In step S61, the OFF period Toff which is set to radiate the heat of the electronic load device 7 after the ON period Ton of the intermittent period T of the electronic load device 7 is set as a set value of a standby time till the processing shifts to the next measurement processing, the time after the measurement processing is finished is counted, and it is determined whether this counted time has passed over the set standby time or not until the standby time has elapsed. When it is determined that the standby time has elapsed, the processing returns to the step S1 at the branch Y so that the set value of the load current instruction to the electronic load device 7 is changed to a new set value, and then the measurement processing is executed.

When the processing as described above is repetitively executed and it is determined in step S6 that the measurement processing frequency N reaches the set frequency Ns, the processing shifts to step S7 from the branch Y, and the measurement is finished.

In the processing as described above, the electronic load device 7 is stepwise turned on for only a short time at each measurement step to make load current flow and adjust the output current of the solar cell 1, whereby the voltage and the current can be measured over the whole range from the open state to the short-circuit state of the solar cell with respect to the operation point of the solar cell. The current-voltage characteristic of the solar cell can be determined on the basis of all the data of the measured voltage and current.

According to the embodiment 1, when the voltage and current of the solar cell 1 are measured, the electronic load device 7 is turned on at an extremely short time interval of about several ms while the measurement is divided into plural stages, and the voltage and the current are measured during the voltage stable period for which the output voltage V of the solar cell 1 is stable within the ON period of the electronic load device 7. Therefore, a compact device having a small heat capacity can be used as the electronic load device, and also the voltage and the current can be accurately measured. Furthermore, in the embodiment 1, the electronic load device uses the current control element for performing current control. However, by using a voltage control element for controlling the voltage, the voltage and the current can be measured while the operation point is changed by adjusting the output voltage of the solar cell.

Embodiment 2

FIG. 5 shows a second embodiment according to the present invention, and the second embodiment will be described hereunder.

The construction of the embodiment 2 is basically the same as the embodiment 1, however, it is different from the embodiment 1 in that the electronic load device 7 is constructed by plural (n) electronic load units 7-1 to 7-$n$ and connected to MPU 9 through plural selectable measuring switches 8-1 to 8-$n$, and the measurement timing of the voltage and current are determined not on the basis of the lapse time, but by monitoring the voltage variation at the time when the load of the solar cell 1 is put in and actually detecting that the voltage is stabilized. According to the embodiment 2, the measuring time is shortened to be less and thus the measurement speed is increased.

The capacitance of each of the electronic load units 7-1 to 7-$n$ of the electronic load device 7 is set to equal capacitance corresponding to 1/n of the total capacitance of the electronic load device 7. The electronic load device 7 is not necessarily constructed by combining electronic load units each having equal capacitance, but may be constructed by combining electronic load units which are different in capacitance.

In the following example, each electronic load unit of the electronic load device 7 is operated in a cycle that it is operated for only a predetermined time T to bear load current and turned off during a rest time 4T which is four times as long as an operating time T. When the electronic load units are intermittently controlled in the cycle as described above, heat occurring during the operating time 1T is radiated during the rest time 4T, whereby the electronic load units can be stably operated without being overheated.

In the embodiment 2 shown in FIG. 5, selecting gates 11-1 to 11-n are provided to selectively operate the plural electronic load units 7-1 to 7-n of the electronic load device 7, and signals S1 to Sn for selecting the electronic load units are supplied from MPU 9 to the selecting gates. The selecting gates 11-1 to 11-n are supplied with not only the selecting signals S1 to Sn, but also an opening/closing signal to be commonly applied to the measuring switches 8-1 to 8-n from the timer 10. The load current instruction Is for the electronic load device is commonly supplied from MPU 9 to the measuring switches 8-1 to 8-n.

When the characteristic of the solar cell 1 is measured, the load current instruction Is and the selection signals S1 to Sn which are stepwise adjusted in a predetermined order are output from MPU 9 according to a preset program, and synchronously with this output, the set signal is output to the timer 10. Accordingly, for example, the selection signal S1 is output, and the put-in signal is supplied from the timer 10 to the measuring switch 8-1, whereby the gate 11-1 is opened, the measuring switch 8-1 is turned on, the load current instruction Is is applied from MPU 9 to the electronic load unit 7-1 to turn on the electronic load unit 7-1, and the current of the load circuit of the solar cell 1 is adjusted to the instructed current value. Under this state, the detection values of the voltage V and the current I of the output of the solar cell 1 which are detected by the voltage detector 2 and the current detector 3 are read and stored into MPU 9, and one measurement is terminated. In accordance with the termination of the measurement, MPU 9 transmits the reset signal to the timer 10 to reset the timer 10.

The voltage and the current in the overall area of the load state from the open state to the short-circuit state of the solar cell 1 are measured while stepwise changing the electronic load unit to be selected and the load current instruction Is, thereby determining the output (current-voltage) characteristic.

An example of the control pattern of the electronic load unit of the electronic load device 7 which is based on the change of the load current instruction Is will be described with reference to FIG. 6(b).

The control pattern of the electronic load unit shown in FIG. 6(b) is an example of the control pattern when the electronic load device is constructed by four electronic load units whose current capacities are respectively set to ¼ of the total current capacity Ia of the electronic load device, and the control pattern is adjusted every unit current of Ia/16.

The load current can be borne by a single electronic load unit until the load current reaches Ia/4. Therefore, the load current instruction Is is continuously applied to the electronic load units 7-1 to 7-4 at the period of the current supply time T to turn on the electronic load units 7-1 to 7-4, whereby the load current can be stepwise increased by every Ia/16.

The load current can be borne by two electronic load units until the load current exceeds Ia/4 and then reaches 2Ia/4. Therefore, every two electronic load units are selected and turned on to stepwise increase and adjust the load current by every Ia/16. At this time, each electronic load unit requires the rest period of 4T at the minimum until each electronic load unit is turned off and subsequently turned on, and the electronic load units are alternately turned on every two electronic load units with the rest period of 1T or 2T being interposed between the respective turn-on operations.

The load current can be borne by three electronic load units until the load current exceeds 2Ia/4 and then reaches 3Ia/4. Therefore, three electronic load units are selected and simultaneously turned on, whereby the load current is likewise stepwise increased and adjusted by every Ia/16.

The load current is required to be borne by four electronic load units until the load current exceeds 3Ia/4 and reaches Ia, and thus four electronic load units are selected and simultaneously turned on, whereby the load current is likewise stepwise increased and adjusted by every Ia/16.

Three out of four electronic load units or four electronic load units are selected until the load current exceeds 2Ia/4 and reaches Ia, and thus 4T is required for the rest period during the ON period.

In this case, it is assumed that plural electronic load units equally bear the current when the plural electronic load units are simultaneously turned on.

In the device of the embodiment 2, the electronic load device is constructed by plural electronic load units, and the load current is controlled on the basis of the pattern as shown in FIG. 6(b) to perform the measurement. Therefore, the measurement time can be greatly shortened particularly in the range that the load current is small, and the measurement speed can be increased.

FIG. 6(a) shows the control pattern of the electronic load device according to the embodiment 1 in which the electronic load device is constructed by a single electronic load unit. In the device of the embodiment 1, one electronic load unit is provided, and thus the electronic load device has the control pattern in which the rest period of 4T is put after the ON period of 1T from beginning to end.

As is apparent from the comparison between the control patterns of FIG. 6(a) and FIG. 6(b), according to the device of the embodiment 2, the measurement time is shortened to a half or less of the measurement time in the case of the device of the embodiment 1 in a small load current range in which the load current is equal to 2Ia/4 or less, and thus the measurement can be performed at a higher speed.

All the control patterns of the load current for measuring the characteristic of the solar cell 1 as described above are formed by MPU 9, and each electronic load unit of the electronic load device is instructed according to this pattern.

A specific operation of measuring the output characteristic of the solar cell 1 by the device of the embodiment 2 will be described with reference to the flowchart of FIG. 7.

When MPU 9 is instructed to start a measurement in step S10, the load current instruction Is is set from MPU 9 to the electronic load device 7 according to a preset program in step S11. In step S12, the number n of electronic load units to be driven (n=Is/the current capacity of the electronic load unit) is determined on the basis of the set load current instruction value Is, the electronic load units to be driven are selected in accordance with the determined number of the units to be operated in step S13, an electronic load unit selection signal is output to the selected gates, and then the processing shifts to the next step S14. In step S14, the timer 10 is set.

Accordingly, the selected gates 11-1 to 11-n are turned on to put in the corresponding measuring switches 8-1 to 8-n, and the load current instruction Is is applied to the selected electronic load units, whereby the selected electronic load units are operated to adjust the current I of the load circuit of the solar cell 1 to the instructed current value. Accordingly, the output voltage of the solar cell 1 varies as shown in FIG. 3(*a*) due to the effect of the junction capacitance as in the case of the embodiment 1. In the embodiment 2, in order to detect whether the voltage varying as described above is set to a stable state, the voltage variation is monitored from the output of the voltage detector 2 in MPU 9 as shown in step S15, and it is determined whether the voltage variation is equal to zero or not. When the voltage variation is not equal to zero, the processing shifts to step S151 from the branch N.

In step S151, the monitoring time of the voltage variation is monitored, and it is determined whether this monitoring time has passed over the time set in the timer 10. When the monitoring time has not yet passed, the processing returns to the step S15 from the branch N, and the monitoring of the voltage variation is continued. The monitoring time has passed over the set time when the time of current supply to the electronic load device exceeds a preset maximum permissible time due to some abnormality. Accordingly, in this case, in order to protect overheat of the electronic load device, the processing goes to step S152 from the branch Y to stop the measurement, and abnormality processing is executed.

When it is determined in step S15 that the voltage variation is equal to zero and thus the voltage stable period has come, the processing goes to step S16 from the branch Y, and the processing of reading and storing the detection values of the voltage detector 2 and the current detector 3 is executed. When this processing is finished, the processing of resetting the timer 10 and turning off the electronic load device 7 in step S17 and the processing of releasing the selection of the electronic load units in step S18 are executed sequentially.

Subsequently, the processing of determining whether the measurement frequency reaches a specified measurement frequency or not is executed in step S19, and when the measurement frequency does not reach the specified measurement frequency, the processing shifts to step S191 from the branch N. In step S191, the processing of determining whether the lapse time from the time when the current supply to the electronic load device 7 is stopped and the measurement is finished has passed over a predetermined standby time till a next measurement is executed. This predetermined standby time is not constant at all times, and it is determined in accordance with the load status in each case, that is, the conditions of the currently operated electronic load units and selected electronic load units to be next operated as described with respect to the control pattern of the electronic load unit of FIG. 6. When the lapse time does not reach the predetermined standby time, the next measurement cannot be performed. Therefore, the processing returns from the branch N to the step S191, and this determination processing is repeated until the lapse time has passed over the predetermined standby time. When it is determined that the time has passed over the predetermined standby time, the processing returns from the branch Y to the first step S11 to shift to a new measurement step, and repetitively executes this operation until the measurement frequency reaches the specified frequency. When the measurement frequency reaches the specified frequency, in step S19, the processing shifts to step S20 from the branch Y, and the measurement processing is finished. As described above, the measurement processing is executed at the specified frequency, whereby the voltage and the current over the whole area of the load state from the open state to the short-circuit state of the solar cell 1 can be measured and recorded.

As described above, according to the embodiment 2, in order to increase the measurement speed, the electronic load device 7 is constructed by the plural divided electronic load units 7-1 to 7-*n*, and also the detection of the voltage stable period is executed at each measurement step by monitoring the variation of the voltage of the solar cell at the time when the electronic load is put in and detecting that the voltage variation is equal to zero.

The voltage variation at the time when the load of the solar cell is changed is caused by the junction capacitance possessed by the solar cell, and charges q which are charged/discharged into/from this junction capacitance have the following relationship:

$$q = i(\text{current}) \times t(\text{time})$$

As the current i taken out from the solar cell 1 is smaller, the time required until the voltage is stabilized is longer, and as the current i is larger, the time required until the voltage is stabilized is shorter.

Therefore, in the case of the embodiment 1 in which the detection of stability of the voltage is executed on the basis of the time, it is necessary to set the set time as a reference to a time at which the voltage is sufficiently stabilized for even small current i, and thus the time is set to a longer time, and it is unavoidable that the overall measurement time is long.

In the case of the embodiment 2, the voltage variation is monitored and it is detected that the charge variation is equal to zero. Accordingly, it is unnecessary to wait for a predetermined time like the embodiment 1, and the measurement can be performed immediately after the voltage is stabilized. In addition, the time required until the voltage is stabilized is short for large current, so that the measurement time can be shortened.

Embodiment 3

Next, there will be described a measuring device according to an embodiment 3 of the present invention which is improved so that the maximum power point can be determined more accurately when the current-voltage characteristic of the output of the solar cell installed outdoors is measured under a weather condition in each case.

The solar cell generally has a property that the output characteristic greatly varies in accordance with a weather condition in each case when the current-voltage characteristic of the output of the solar cell is measured under outdoor natural sunlight. Particularly, it is known that the output current taken out from the solar cell varies remarkably in accordance with the intensity of solar isolation.

Furthermore, the nominal rated value of the solar cell is determined on the basis of the output characteristic value measured under a reference state (solar cell module temperature 25° C., solar isolation intensity 1000 W/m$^2$). Therefore, when the output characteristic of the solar cell installed outdoors is measured under a weather condition in each case, it frequently trends to be less than the rated characteristic.

For example, when the characteristic measurement of a solar cell having a rated short-circuit current value of 10 A is performed under outdoor natural sunlight, the following disadvantage occurs when the measurement is executed by the measuring device of the embodiment 1 or the embodiment 2 while the measurement current range is set to 10 A in conformity with the rated value and the current is adjusted in the range of the measurement frequency determined for the measuring device.

That is, in such a case that only a half of the rated value, 5 A is obtained as the short-circuit current (maximum output current) under the actual measurement because of a bad weather condition when the characteristic of the solar cell installed outdoors is measured, measurement data obtained at a half measurement frequency of the measurement frequency determined for the measuring device are useless and thus the resolution of the measurement is rough and lowered.

As described above, in a case where the measurement resolution is lowered, as standardized by Japanese Industrial Standards (JIS) C8913 and C8914 or the like, when the maximum power point power Pm and the voltage Vm at that point are approximately determined from three points of a measurement point (Pi, Vi) at which the maximum power of the measurement value is obtained according to the Lagrangian secondary interpolation method, and measurement points (Pi−1, Vi−1) and (Pi+1, Vi+1) before and after the measurement point (Pi, Vi), the determined maximum power point power is greatly displaced from the actual maximum power point power because the measurement values at these three points are greatly away from one another (the mutual deviation increases), and thus the maximum power point cannot be accurately determined.

In order to overcome the disadvantage as described above and enable the maximum power point to be more accurately determined, according to the measuring device of the embodiment 3, load control pattern setting means 91 is added as software to MPU 9 in the measuring device of the embodiment 1 or the embodiment 2 shown in FIGS. 1 and 5.

FIG. 8 shows the construction of the measuring device of the embodiment 3. The basic construction is the same as the measuring device of the embodiment 1 shown in FIG. 1, and it is different only in that the load control pattern setting means 91 constructed as software is added in MPU 9. The load control pattern setting means 91 executes a processing operation as shown in FIG. 9.

The operation of the measuring device constructed by adding the load control pattern setting means 91 to the measuring device of the embodiment 1 of FIG. 8 will be described hereunder.

A setting start instruction is applied to the load control pattern setting means 91 in step S20 of FIG. 9 before the measuring device of FIG. 8 is connected to a solar cell installed under outdoor natural sunlight as a measuring target and a characteristic measurement is started. Accordingly, the load control pattern setting means 91 starts to operate, and executes open voltage measuring processing of turning off the electronic load device 7 in the next step S21 so that the output terminal of the solar cell 1 is set to an open state, and reading and storing the voltage detected by the voltage detector 2 as an open voltage Voc of the solar cell under the open state.

When this processing is finished, the processing goes to step S22, and the electronic load device 7 is set to the preset maximum load current Iss and turned on, whereby the maximum load is applied to the solar cell 1.

In the next step S23, there is executed short-circuit voltage/current measuring processing of reading and storing, as a short-circuit voltage value Vsc and a short-circuit current value Isc, the output voltage and current of the solar cell 1 which are detected by the voltage detector 2 and the current detector 3 under the state that the maximum load is applied to the solar cell 1 by the electronic load device 7.

After this processing, in order to determine in step S24 whether the capacity of the solar cell as the measurement target and the capacity of the measuring device being used are matched with each other, it is determined whether the short-circuit voltage Vsc read out in the preceding step S23 decreases to a voltage which is equal to or less than a predetermined determination reference voltage preset to 3% of the open voltage Voc, for example. As a result, when the short-circuit voltage Vsc is higher than the determination reference voltage, it is determined that the capacity of the solar cell as the measurement target is larger than the rated capacity of the measuring device, particularly the rated current capacity and it is not matched with the rated capacity of the measuring device. Accordingly, the processing goes from the branch N to step S241 to execute abnormality processing, alarms and displays that the capacities of the solar cell and the measuring device are not matched with each other, and stops the subsequent measuring operation.

When the short-circuit voltage Vsc is lower than the determination reference voltage, it is determined that the solar cell and the measuring device are matched with each other in capacity, and thus the processing goes from the branch Y to step S25 to execute load control pattern setting processing of creating and setting a control pattern for stepwise varying the load current to be applied to the solar cell 1 in the range of a preset number of measurement points on the basis of the short-circuit current Isc which is measured and taken in step S23.

When this processing is finished, the processing goes to the measurement start step S0 or S10 of the device according to the embodiment 1 or 2 shown in FIG. 4 or 7, and applies a load to the solar cell on the basis of a newly set load control pattern to execute the measurement of the operation characteristic.

A specific method of creating the load control pattern in the above load control pattern setting processing will be described by applying to a case where the operation characteristic of a solar cell which operates at the open voltage of 20.50V, the short-circuit current of 5.13 A, the maximum power of 77.25 W, the maximum power point voltage of 16.43V and the maximum power point current of 4.70 A is measured by using the measuring device having the rated maximum load current capacity of 10 A. In the measuring device, the number of measurement points is set to 40 points. This measurement point number is not limited to 40 points, and it may be set to any number.

(1) Setting Method of Embodiment 1

According to a first setting method for the load control pattern in the measuring device of the embodiment 1, since the open voltage and the short-circuit current are not measured before the characteristic measurement is started, the current (in this case, 10 A) which is determined on the basis of the rated current capacity of the measuring device is set to the maximum load current, and the load control pattern is set on the basis of this current. The load current instruction value Is which is formed by this load control pattern is stepwise varied over 40 steps (the number of measurement points) from 10 A to 0 A.

FIG. 10 shows measurement data when the characteristic of the solar cell 1 is measured according to the load control pattern as described above. FIG. 10 shows the load current instruction value Is, the measured voltage V, the measured current I and the measured power W at each of the measurement points from 1 to 40.

The load current instruction Is applied to the electronic load device 7 varies with a substantially fixed variation width at 40 steps from 10 A to 0 A according to the set load control pattern as shown in the column of the load current instruction value Is of FIG. 10.

However, the solar cell as the measurement target is a solar cell having a capacity that the current under the short-circuit state is equal to 5.13 A at most. Therefore, the measurement data of the measurement points from 1 to 19 of FIG. 10 are useless data which are not useful as data representing the characteristic of the solar cell concerned, and thus only the measurement data of the measurement points from 20 to 40 are effective data.

As a result, according to this method, only the measurement data for which the load state from the short-circuit state to the open state of the solar cell is decomposed into 21 stages are effective although the measurement is performed by the measuring device of the measurement point number of 40, and thus the resolution of the measurement data is lowered.

(2) Setting Method 1 of Embodiment 3

According to the first setting method for the load control pattern in the device of the embodiment 3, since the solar cell as the measurement target is a solar cell having a characteristic that the short-circuit current measured under the state that the solar cell before the characteristic measurement is set to the short-circuit state is equal to 5.13 A, on the basis of the short-circuit current value, the maximum load current instruction value is set to 6 A, a load control pattern for forming the load current instruction values which are to be applied while sectioned into the 40 steps corresponding to the measurement point number is created, and this load control pattern is set as the load control pattern.

A result obtained by performing the characteristic measurement according to the load control pattern set by this method is shown in FIG. 11. The solar cell as the measurement target is the same as described above.

As is apparent from FIG. 11, according to this method, the current under the state that the solar cell is set to the short-circuit state is measured in advance, and the load control pattern, particularly the maximum load current instruction value is set on the basis of the measured current, so that the useless measured data are within a slight range of the measurement points from 1 to 5. Therefore, the resolution of the measurement data can be enhanced as compared with the method of (1) described above.

(3) Setting Method 2 of Embodiment 3

The second setting method of the embodiment 3 further improves the first setting method of the embodiment 3. According to this method, the load control pattern is matched with the characteristic of the solar cell.

It is generally known that a crystalline type solar cell formed of a crystalline semiconductor has the maximum power point in the neighborhood of 80% of the open voltage Voc and 90% of the short-circuit current Isc, and an amorphous type solar cell formed of an amorphous semiconductor has the maximum power point in the neighborhood of 70% of the open voltage Voc and 70% of the short-circuit current Isc.

In order to match the characteristic of the solar cell as described above, according to this method, a load current control pattern is set by allocating measurement points so that the measurement interval is narrow (for example, 60% of all the measurement points are allocated) in the current range of 60 to 100% of the short-circuit current Isc and the measurement interval is broad (for example, 40% of all the measurement points are allocated) in the remaining current range of 0% to 60% with a slight margin so that the load current control pattern is not classified in accordance with the type of the solar cell.

FIG. 12 shows measurement data when the characteristic of the same solar cell as described above is measured according to the load control pattern set by this method.

As shown in FIG. 12, there is obtained a pattern in which the load current instruction value Is varies at the interval of 0.1 A in the range between the measurement points 1 and 25 which corresponds to 100% to 60% of the short-circuit current Isc, and the load current instruction value Is varies at the interval of 0.24 A in the range between the measurement points 26 and 40 which corresponds to 60% to 0% of the short-circuit current Isc.

When the load control pattern as described above is set, the measurement interval in the measurement range containing the maximum power point can be made more minute.

FIG. 13 shows a comparison result of the maximum power point power determined from the measurement result obtained by the Lagrangian secondary interpolation method according to the measurement result based on the measuring device in which the load control patterns are set by the three methods.

As shown in FIG. 13, the maximum power determined from the measurement result in the setting method 2 of the embodiment 3 is equal to 77.24 W which is nearest to the maximum power of 77.25 W of the solar cell as the measurement target, and thus it is understandable that this method is accurate.

Furthermore, the maximum power of 77.08 W determined from the measurement result in the setting method 1 of the embodiment 3 is slightly nearer to the true value (77.25 W) of the maximum power than the maximum power of 77.06 W determined from the measurement result in the setting method of the embodiment 1, and thus this method is more accurate as compared with the setting method of the embodiment 1.

By setting the load control pattern according to the setting methods 1 and 2 of the embodiment 3, the deviation in measurement value between the measurement point at the maximum power point and the points before and after the measurement point concerned in the respective measurement results (see FIG. 11, FIG. 12) can be reduced.

The following methods may be adopted as the method of setting the load control pattern to accurately determine the power at the maximum power point.

(a) Load control patterns are prepared in advance in accordance with the type (crystalline type, non-crystalline type) of the solar cell, and they are switched to one another and used in accordance with the type of the solar cell.

(b) Load control patterns are prepared every 1 A in advance, and a load control pattern which is matched with a measured short-circuit current value is selected and set. For example, when the short-circuit current value is equal to 4.8 A, a load control pattern of 5 A is applied.

(c) A load control pattern of 1 A is prepared in advance, and a value obtained by multiplying the value of the pattern concerned by a short-circuit current value is used as control data.

(d) A load control pattern at the maximum current on the specification of the measuring device is prepared, and it is multiplied by "short-circuit current value/maximum current value" and used.

In the above embodiments, the method of setting the load control pattern on the basis of the current is described. However, according to the present invention, the voltage under the open state of the solar cell may be measured before the characteristic measurement is started, and the load control pattern may be set on the basis of this open voltage.

DESCRIPTION OF REFERENCE NUMERALS

1: solar cell
2: voltage detector
3: current detector
7: electronic load device
7-1 to 7-*n*: electronic load unit
8, 8-1 to 8-*n*: measuring switch
9: microprocessor unit (MPU)
10: communication control timer
11-1 to 11-*n*: electronic load selecting gate

The invention claimed is:
1. A solar cell characteristic measuring device having a load circuit for a solar cell that is configured such that an electronic load device for enabling a load current or a load voltage to be variably set is connected to the solar cell and a measuring circuit configured such that a voltage detector and a current detector are connected to the load circuit, characterized by comprising:

an operation point control means for controlling an operation point of the solar cell by sectionalizing magnitude of a load taken from the solar cell by the electronic load device in a range from an open state of the solar cell till a short-circuit state of the solar cell and stepwise changing the magnitude of the load while periodically intermittently operating the electronic load device in the load circuit and a processing means for reading detection values of the voltage detector and the current detector of the measuring circuit during a period when an output voltage or current of the solar cell is stable every operation period of the electronic load device and processing the read data to determine an output characteristic, wherein the operation point control means is configured to apply an operation instruction to the electronic load device at a predetermined period, a time width of the operation instruction is set to be longer than a time period from application of a load to the solar cell till stabilization of the output voltage or current thereof the processing means reads the detection values of the voltage detector and the current detector after the output voltage or current of the solar cell is stabilized, and the operation point control means suspends the operation instruction immediately after the reading operation till a next operation instruction is given to stop the electronic load device.

2. The solar cell characteristic measuring device according to claim 1, wherein the time width of the operation instruction applied to the electronic load device is changed in accordance with a load current value or voltage value to be instructed to the electronic load device.

3. The solar cell characteristic measuring device according to claim 1, further comprising:

means for forcedly interrupting the operation instruction applied from the operation point control means to the electronic load device when the operation instruction is continued for a predetermined time or more.

4. The solar cell characteristic measuring device according to claim 1, wherein the electronic load device is constructed by a plurality of electronic load units and the electronic load units are combined and selectively operated every electronic load unit or every plural electronic load units.

5. The solar cell characteristic measuring device according to claim 1, further comprising:

a load control pattern setting means for measuring a voltage under an open state of the solar cell and a current under a short-circuit state of the solar cell before a characteristic measurement is started, and creating and setting a load control pattern on the basis of the measured open voltage or short-circuit current, wherein the electronic load device is controlled according to the load control pattern set by the load control pattern setting means to perform a characteristic measurement.

6. The solar cell characteristic measuring device according to claim 1, wherein the load control pattern setting means sets a measuring section minutely in a range larger than 50% of the measured open voltage or short-circuit current.

7. A solar cell characteristic measuring device having a load circuit for a solar cell that is configured such that an electronic load device for enabling a load current or load voltage to be variably set is connected to the solar cell and a measuring circuit configured such that a voltage detector and a current detector are connected to the load circuit, characterized by comprising:

an operation point control means for controlling an operation point of the solar cell by sectionalizing magnitude of a load taken from the solar cell by the electronic load device in a range from an open state of the solar cell till a short-circuit state of the solar cell and stepwise changing the magnitude of the load while periodically intermittently operating the electronic load device in the load circuit and a processing means for reading detection values of the voltage detector and the current detector of the measuring circuit during a period when an output voltage of the solar cell is stable every operation period of the electronic load device and processing the read data to determine an output characteristic, wherein the operation point control means is configured to apply an operation instruction to the electronic load device at a predetermined period, a time width of the operation instruction is set to be longer than a time period from application of a load to the solar cell till stabilization of the output voltage or current thereof, the processing means monitors a variation of output voltage or current of the solar cell after the operation instruction to the electronic load device and reads the detection values of the voltage detector and the current detector at a time when no change is detected, and the operation point control means suspends the operation instruction immediately after the reading operation to stop the electronic load device till a next operation instruction is given.

8. The solar cell characteristic measuring device according to claim 7, wherein the time width of the operation instruction applied to the electronic load device is changed in accordance with a load current value or voltage value to be instructed to the electronic load device.

9. The solar cell characteristic measuring device according to claim 7, further comprising:

means for forcedly interrupting the operation instruction applied from the operation point control means to the electronic load device when the operation instruction is continued for a predetermined time or more.

10. The solar cell characteristic measuring device according to claim 7, wherein the electronic load device is constructed by a plurality of electronic load units and the electronic load units are combined and selectively operated every electronic load unit or every plural electronic load units.

11. The solar cell characteristic measuring device according to claim 7, further comprising:

a load control pattern setting means for measuring a voltage under an open state of the solar cell and a current under a short-circuit state of the solar cell before a characteristic measurement is started, and creating and setting a load control pattern on the basis of the measured open voltage or short-circuit current, wherein the electronic load device is controlled according to the load control pattern set by the load control pattern setting means to perform a characteristic measurement.

12. The solar cell characteristic measuring device according to claim 7, wherein the load control pattern setting means sets a measuring section minutely in a range larger than 50% of the measured open voltage or short-circuit current.

* * * * *